US008024284B2

(12) United States Patent
Dhanekula et al.

(10) Patent No.: US 8,024,284 B2
(45) Date of Patent: Sep. 20, 2011

(54) ACCURATELY INFERRING PHYSICAL VARIABLE VALUES ASSOCIATED WITH OPERATION OF A COMPUTER SYSTEM

(75) Inventors: Ramakrishna C. Dhanekula, San Diego, CA (US); Kenny C. Gross, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 853 days.

(21) Appl. No.: 12/001,369

(22) Filed: Dec. 10, 2007

(65) Prior Publication Data

US 2009/0150324 A1 Jun. 11, 2009

(51) Int. Cl.
*G06F 9/44* (2006.01)
*G06N 7/02* (2006.01)
(52) U.S. Cl. ................... 706/52; 706/46; 706/8
(58) Field of Classification Search .................. None
See application file for complete search history.

(56) References Cited

OTHER PUBLICATIONS

Hertz, E., "Thermal and EMI Modeling and Analysis of a Boost PFC Circuit Designed Using a Genetic-based Optimization Algorithm", pp. 1-155, 2001.*

Tankielun et al., A., "Electromagnetic Near-Field Scanning for Microelectronic Test Chip Investigation", IEEE, pp. 68-72, 2006.*
Bater et al., J., "Modelling Interference Temperature Constraints for Spectrum Access in Cognitive Radio Networks", IEEE, pp. 1- 6, 2007.*
Zhu et al., H., "Modeling-Based Examintation of Conducted EMI Emissions From Hard- and Soft-Switching PWM Inverters", IEEE Transactions on Industry Application, vol. 37, No. 5, pp. 1383-1393, Sep./Oct. 2001.*
Busquets-Monge et al., S., "Design Optimiaztion of a Boost Power Factor Correction Converter Using Genetic Algorithms", IEEE, pp. 1-6, 2002.*

* cited by examiner

*Primary Examiner* — Jeffrey A Gaffin
*Assistant Examiner* — Adrian L Kennedy
(74) *Attorney, Agent, or Firm* — Park, Vaughan, Fleming & Dowler LLP

(57) ABSTRACT

One embodiment of the present invention provides a system that monitors a physical variable associated with an electronic component within a computer system. During operation, the system receives telemetry signals of the physical variable which are collected by one or more physical sensors associated with the electronic component. The system also collects electromagnetic interference (EMI) signals generated by the electronic component. Next, the system builds an inferential model for the physical variable by correlating the EMI signals with the telemetry signals. The system then uses the inferential model to infer values for the physical variable from the EMI signals.

24 Claims, 6 Drawing Sheets
(1 of 6 Drawing Sheet(s) Filed in Color)

ACCURATELY INFERRING PHYSICAL VARIABLE VALUES ASSOCIATED WITH OPERATION OF A COMPUTER SYSTEM

BACKGROUND

1. Field of the Invention

The present invention generally relates to techniques for monitoring physical variables associated with the operation of a computer system. More specifically, the present invention relates to a method and an apparatus that accurately infers the outputs of physical sensors that are used to monitor the physical variables using EMI signals.

2. Related Art

Modern server computer systems are typically equipped with a significant number of physical sensors which monitor signals during the operation of the computer systems. For example, most CPUs are currently equipped with on-chip thermal diodes that are used to monitor CPU core temperatures. Other monitored signals can include voltages, currents, fan speeds, and other physical variables associated with the computer system operation. Results from this monitoring process can be used to generate time series data for these signals which can subsequently be analyzed to determine how a computer system is operating. One particularly desirable application of this time series data is for purposes of "proactive fault monitoring" to identify leading indicators of component or system failures before the failures actually occur.

Note that the physical sensors inside computer systems can degrade over time, which can lead to "stuck-at" faults or other failure modes of a physical sensor. In many cases, the mean time between failures (MTBF) of the physical sensors can be shorter than the MTBF for the components or systems that the sensors are designed to protect. However, it is typically not commercially feasible to deploy multiple, redundant physical sensors inside server computer systems to monitor a particular physical variable (unless they are safety critical systems). Consequently, when physical sensors degrade or fail during service, they have to be replaced to ensure the safety of the computer systems.

Unfortunately, replacing the degraded or failed physical sensors within a computer system may require replacing the complete system boards or field replaceable units (FRU)s which contain these physical sensors. For high-end computer systems, this replacement can be prohibitively costly. For example, the uniboards for high-end server computer systems can cost $100K per board. Note that, it is not practical to replace a $100K system board just because a $2 sensor has failed.

Hence, what is needed is method and an apparatus that facilitates replacing a faulty physical sensor in a computer system without the above-described problems.

SUMMARY

One embodiment of the present invention provides a system that monitors a physical variable associated with an electronic component within a computer system. During operation, the system receives telemetry signals of the physical variable which are collected by one or more physical sensors associated with the electronic component. The system also collects electromagnetic interference (EMI) signals generated by the electronic component. Next, the system builds an inferential model for the physical variable by correlating the EMI signals with the telemetry signals. The system then uses the inferential model to infer values for the physical variable from the EMI signals.

In a variation on this embodiment, the electronic component is an integrated circuit (IC) chip; the physical variable is a local temperature on the IC chip; and the one or more physical sensors are temperature sensors.

In a variation on this embodiment, the system collects the EMI signals generated by the electronic component by using an antenna placed in close proximity to the electronic component.

In a further variation on this embodiment, the antenna can be a wire.

In a further variation, the wire is a stripped wire.

In a variation on this embodiment, the telemetry signals for the physical variable are collected while the computer system is executing a load script which includes a specified sequence of operations. Furthermore, the EMI signals are generated by the electronic component while the computer system is executing the same load script.

In a variation on this embodiment, the system builds the inferential model by first transforming the EMI signals from a time-domain representation to a frequency-domain representation. The system then divides the frequency-domain representation into a plurality of frequency bins. Next, the system constructs an EMI amplitude-time series for each of the plurality of frequency bins based on the EMI signals collected over a predetermined time period. The system next selects a subset of frequency bins from the plurality of frequency bins based on a cross-correlation between each EMI amplitude-time series and the telemetry signals. The system then builds the inferential model based on the EMI amplitude-time series associated with the selected frequency bins.

In a further variation on this embodiment, the system selects the subset of frequency bins based on the cross-correlation by: computing a cross-correlation between the EMI amplitude-time series and the telemetry signals for each of the plurality of frequency bins and selecting the subset of frequency bins that are associated with the highest cross-correlation values.

In a further variation, the system builds the inferential model by using the EMI amplitude-time series associated with the selected frequency bins to train a pattern recognition model.

In a further variation, the pattern recognition model is a multivariate state estimation technique (MSET).

In a further variation, the system increases the number of selected frequency bins to train the pattern recognition model, thereby improving the accuracy of the pattern recognition model.

In a variation on this embodiment, when the one or more physical sensors have degraded, the system continues to monitor the physical variable through the EMI signals and the inferential model instead of the physical sensor.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Electromagnetic interference (EMI) signals are generated by computer systems or other electronic systems during operation. These EMI signals are commonly regarded as noise, and electronic systems are often shielded to minimize the amount of EMI signals emitted by the electronic system. However, these EMI signals can also carry information that can be used to generate unique fingerprints for system components. For example, it has been demonstrated that EMI signals generated by CPUs can be converted into digitized time series signals, and then used with a pattern-recognition mechanism for proactive health monitoring of server computer systems.

Embodiments of the present invention use the EMI signals generated by electronic components inside a computer system to "infer" the value of the physical variables (e.g., temperature, voltage, current, or fan speed) associated with these electronic components with very high accuracy. Specifically, for a given physical variable, an inferential model is built based on the correlation between telemetry signals of the physical variable collected by conventional physical sensors and the EMI time series signals collected by an EMI sensor. The inferential model is subsequently used to infer values for the physical variable based on the EMI signals. Note that this technique facilitates "analytically" replacing a faulty physical sensor with the inferential model without the need for physically replacing the faulty physical sensor. Furthermore, this technique also facilitates eliminating physical sensors from the design of a system component.

Computer System

Figure 1:
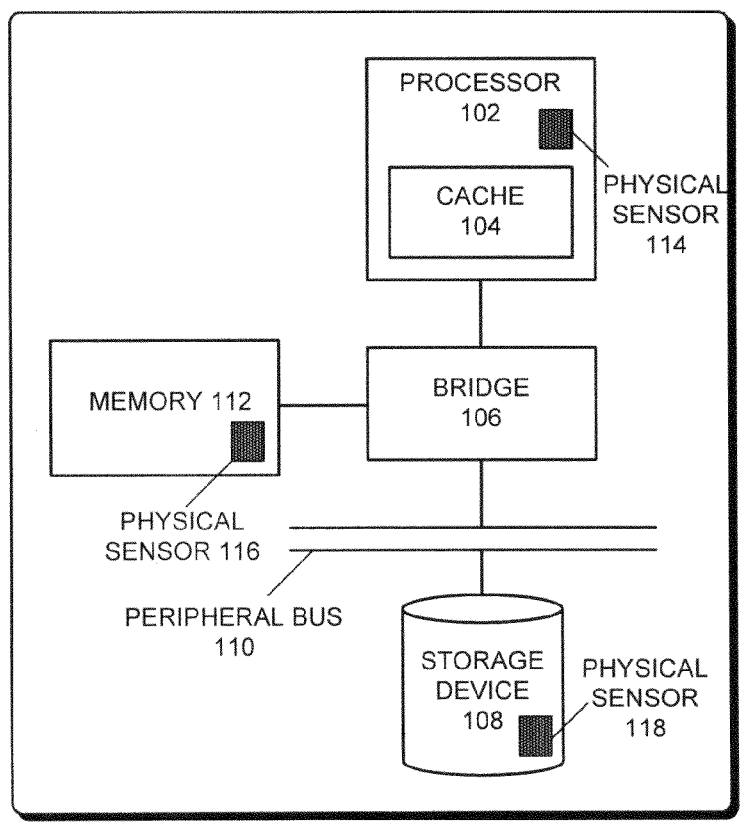
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance, and any other processor now known or later developed. Furthermore, processor 102 can include one or more cores. Processor 102 includes a cache 104 that stores code and data for execution by processor 102.

Although FIG. 1 illustrates computer system 100 with one processor, computer system 100 can include more than one processor. In a multi-processor configuration, the processors can be located on a single system board, or on multiple system boards.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. This includes, but is not limited to, dynamic random access memory (DRAM), static random access memory (SRAM), flash memory, read only memory (ROM), and any other type of memory now known or later developed.

In order to monitor physical variables associated with the operation of computing system 100, several physical sensors 114, 116, and 118 are integrated with a number of system components within computing system 100. For example, physical sensor 114 associated with processor 102 can be a thermal diode for monitoring the core temperature of processor 102. Alternatively, physical sensor 114 can be a voltage sensor for monitoring core voltage "vCore" of processor 102. Physical sensor 116 associated with memory 112 can be used to monitor a particular voltage provided to a bank of storage cells (not shown) in memory 112. Moreover, physical sensor 118 associated with storage device 108 (e.g., a hard disk drive) can be used to monitor the disk rotation speed. Note that multiple physical sensors can be built onto a single system component. For example, processor 102 can include separate temperature and voltage sensors.

Note that although the present invention is described in the context of computer system 100 as illustrated in FIG. 1, the present invention can generally operate on any type of computing device. Hence, the present invention is not limited to the specific implementation of computer system 100 as illustrated in FIG. 1.

EMI Signal Sensing within a Computer System

Figure 2:
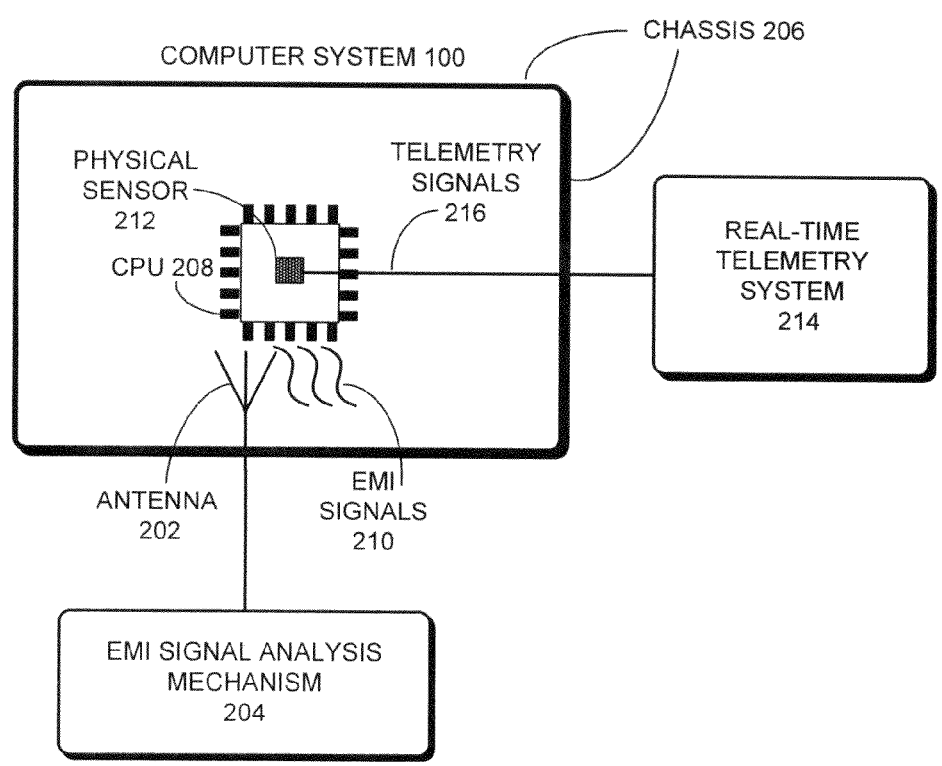
FIG. 2 illustrates a computer system associated with an EMI signal sensing mechanism in accordance with an embodiment of the present invention.

FIG. 2 illustrates computer system 100 associated with an EMI signal sensing mechanism in accordance with an embodiment of the present invention. In this embodiment, the EMI sensor is an antenna 202 coupled to an EMI signal analysis mechanism 204. In one embodiment of the present invention, the EMI signal analysis mechanism 204 can be a spectrum analyzer.

Note that antenna 202 is positioned inside chassis 206 of computer system 100 in an "internal detection" configuration. More specifically, antenna 202 is placed at a predetermined location and in close proximity to CPU 208. In this configuration, antenna 202 can be used to pick up EMI signals 210 generated by CPU 208 with a high signal-to-noise ratio (SNR). Note that antenna 202 can also pick up EMI signals generated by other system components, such as those in the vicinity of CPU 208. Note that, in addition to the distance, the sensitivity of antenna 202 to the EMI emission of CPU 208 can also be affected by its orientation with respect to CPU 208. In one embodiment of the present invention, antenna 202 can be affixed to a mechanical structure in the vicinity of CPU 208. In another embodiment of the present invention, antenna 202 can be affixed to the system board which contains CPU 208.

In some embodiments of the present invention, multiple antennas (not shown) can be simultaneously placed at multiple distributed positions inside computer system 100. In this embodiment, the system can simultaneously collect multiple high-SNR EMI signals from multiple system components or multiple locations across a system module. For example, one antenna can be placed within close proximity to each core of a multi-core CPU to collect EMI emissions from the multiple cores.

Note that the placement of an antenna in relation to a target component is not meant to be limited to the particular configuration illustrated in FIG. 2. In a further embodiment, the antenna may be positioned directly outside chassis 206 of computer system 100, i.e., in an external sensing configuration. However, external sensing may not provide a sufficiently high SNR to discriminate a particular component of interest inside the computer system.

Antenna

In one embodiment of the present invention, antenna 202 can include: a dipole antenna, a Yagi-Uda antenna, a loop antenna, an electrical short antenna (e.g., an open-ended wire having a length less than a quarter wavelength), a fractal antenna, a parabolic antenna, a microstrip antenna, a quad antenna, a random wire antenna (e.g., an open-ended wire having a length greater than one wavelength), a beverage antenna, a helical antenna, a phased array antenna, and any other type of antenna now known or later developed.

In one embodiment of the present invention, antenna 202 is an insulated wire with a fixed length of the insulation stripped off. In this embodiment, the stripped end of the insulated wire is open to free space and the other end of the wire is coupled to the associated receiving mechanism. In one embodiment of the present invention, the stripped length is approximately ½ inch. In another embodiment of the present invention, the length of the antenna can be selected to achieve optimal discrimination sensitivity and robustness. Note that while many types of antennas can be used to collect the EMI signals, stripped wire provides a simple and inexpensive option.

Building an Inferential Model

One embodiment of the present invention uses the EMI time series signals collected from a system component to build an inferential model for a physical variable associated with that system component. In order to build the inferential model, embodiments of the present invention additionally collect conventional telemetry signals for the physical variable using a physical sensor associated with the system component.

Collecting Telemetry Signals

As illustrated in FIG. 2, CPU 208 is associated with an embedded physical sensor 212, which can be a voltage sensor or a temperature sensor. Physical sensor 212 measures a specific physical variable X associated with CPU 208 during the operation of CPU 208. In one embodiment of the present invention, physical sensor 212 is coupled to a real-time telemetry system 214. Real-time telemetry system 214 may contain a telemetry device and one or more signal analyzing programs. This telemetry device gathers real-time telemetry signals 216 from physical sensor 212 and directs telemetry signals 216 to local or remote locations where the one or more signal analyzing programs are located. In one embodiment of the present invention, real-time telemetry system 214 is a Continuous System Telemetry Harness (CSTH).

In one embodiment of the present invention, telemetry signals 216 for the physical variable X are collected while computer system 100 is executing a load script, which includes a specified sequence of operations. In one embodiment of the present invention, this load script can include: a sequence of operations that produces a load profile that oscillates between specified CPU utilization percentages; and/or a sequence of operations that produces a customized load profile. Note that a customized load profile can be used to produce a unique signal profile which is difficult to spoof. In one embodiment of the present invention, the load script is a dynamic load script which changes the load on the CPU as a function of time.

In one embodiment, EMI signals 210 are generated by CPU 208 while computer system 100 is executing the same load script when telemetry signals 216 are collected. Consequently, EMI signals 210 and telemetry signals 216 can be analytically correlated.

Deriving Correlation Between EMI Signals and Telemetry Signals

Figure 3:
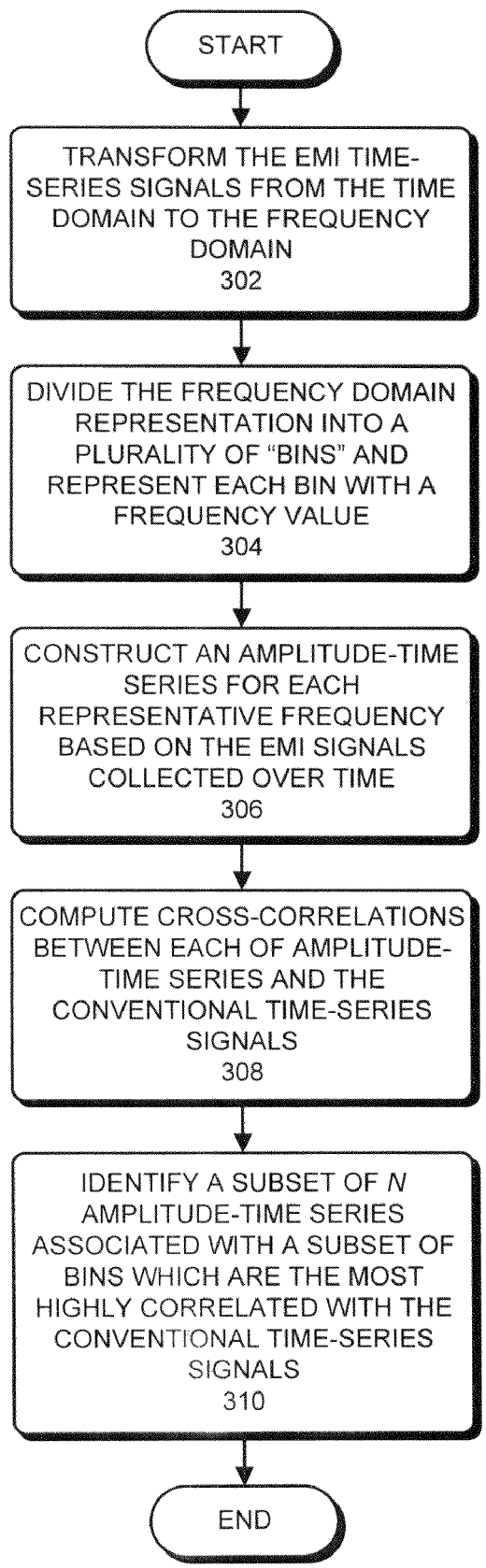
FIG. 3 presents a flowchart illustrating the process of analyzing correlation between the EMI signals and the conventional telemetry signals in accordance with an embodiment of the present invention.

FIG. 3 presents a flowchart illustrating the process of analyzing correlation between the EMI signals 210 and the conventional telemetry signals 216 in accordance with an embodiment of the present invention.

During operation, the system starts by transforming the EMI time series signals from the time domain to the frequency domain (step 302). In one embodiment of the present invention, transforming the EMI time series signals from the time domain to the frequency domain involves using a fast Fourier transform (FFT). In other embodiments, other transform functions can be used, including, but not limited to, a Laplace transform, a discrete Fourier transform, a Z-transform, and any other transform technique now known or later developed.

The system then divides the frequency range associated with the frequency-domain representation of the EMI signals into a plurality of "bins," and represents each discrete bin with a representative frequency value (step 304). For example, one can divide the frequency range into about 600 bins. In one embodiment, these frequency bins and the associated frequency values are equally spaced.

Next, for each of the plurality of representative frequencies of the bins, the system constructs an amplitude-time series based on the EMI time series signals collected over a predetermined time period (step 306). In one embodiment, to generate the time-series for each frequency, the EMI signals are sampled at predetermined time intervals, for example once every second or every minute. Next, each of the sampled EMI signal intervals is transformed into the frequency domain, and an amplitude-time pair is subsequently extracted for each of the representative frequencies at each time interval. In this way, the system generates a large number of separate amplitude-time series for the plurality of frequencies.

Figure 4A:
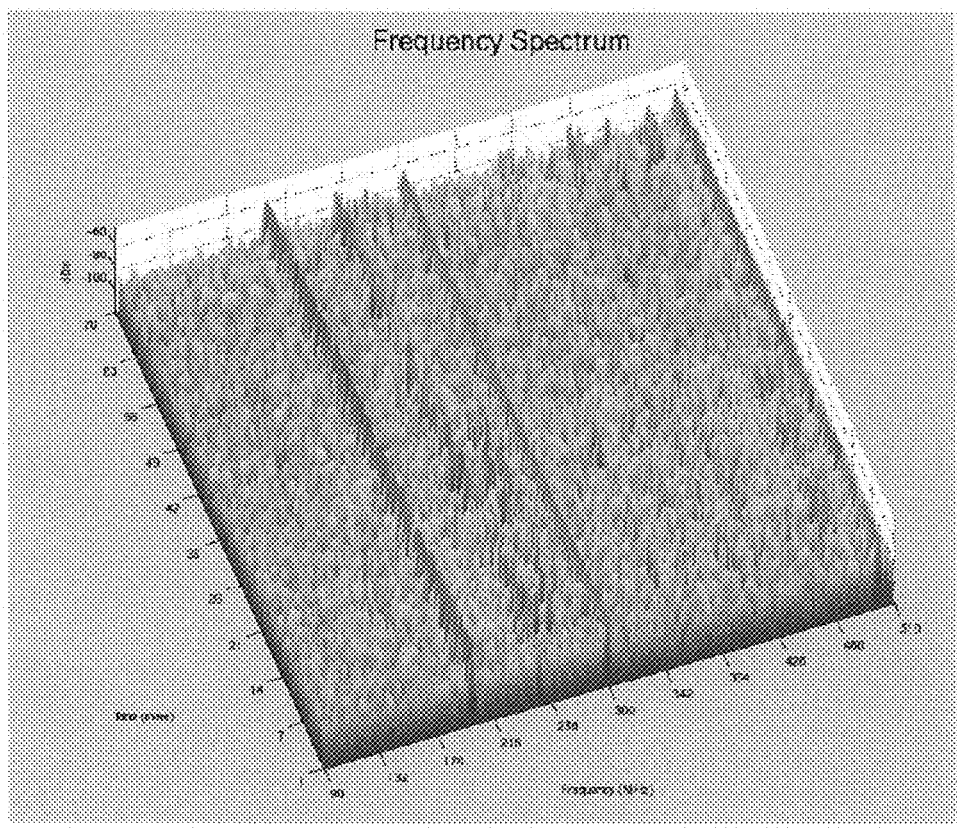
FIG. 4A illustrates a typical EMI frequency-spectrum-time-series plot generated by a system component while executing a load script in accordance with an embodiment of the present invention.
Figure 4B:
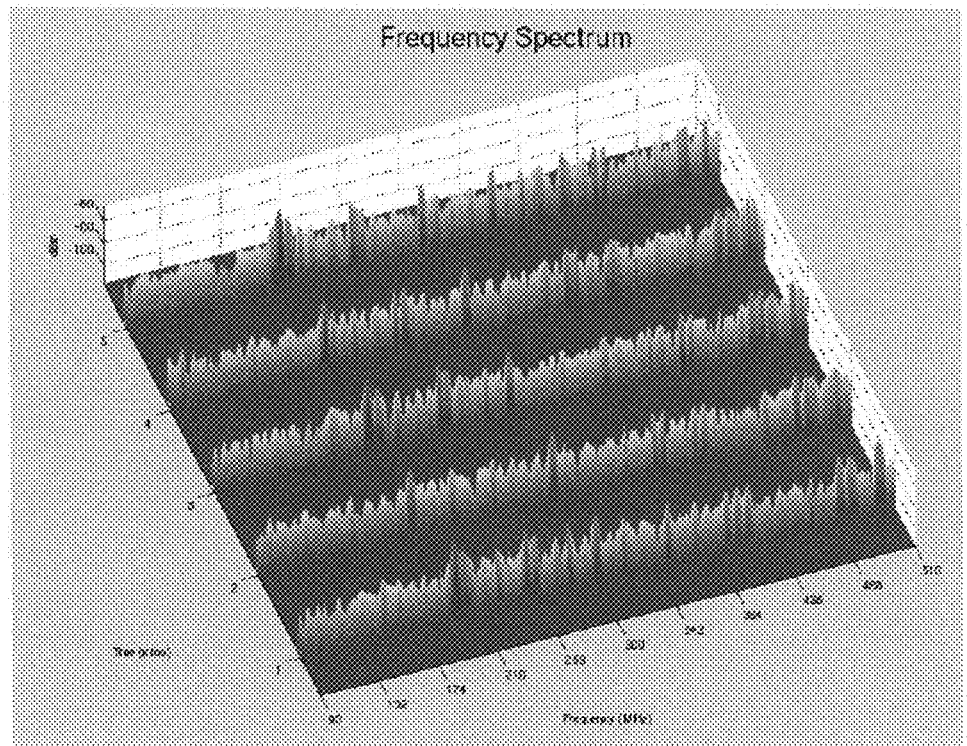
FIG. 4B illustrates a zoomed-in version of the EMI frequency-spectrum-time-series of FIG. 4A in accordance with an embodiment of the present invention.

FIG. 4A illustrates a typical EMI frequency-spectrum-time-series plot generated by a system component while executing a load script in accordance with an embodiment of the present invention. Note that the frequency range is divided into equally spaced bins. For each of the discrete bins, the time observations trace out a time series signature. FIG. 4B illustrates a zoomed in version of the EMI frequency-spectrum-time-series of FIG. 4A in accordance with an embodiment of the present invention. Specifically, FIG. 4B illustrates once-per-minute observations of the EMI signals for bins between 90 MHz and 510 MHz.

Referring back to FIG. 3, the system next computes cross-correlations between each of the amplitude-time series associated with the plurality of bins and the conventional physical-variable-time-series (i.e., the telemetry signals) (step 308), and subsequently identifies a subset of N amplitude-time series associated with a subset of frequency bins which are the most highly correlated with the conventional physical-variable-time-series (step 310). In one embodiment of the present invention, N is typically less than or equal to 20. Note that when dynamic loads are running on a computer system, the EMI time series signals can be extremely well correlated with the conventional physical telemetry signals (e.g., temperatures, voltages and currents).

Building the Inferential Model Based on the Selected EMI Time Series

In one embodiment of the present invention, the inferential model for the physical variable X is obtained by training a pattern-recognition module. In this embodiment, the pattern-recognition module can be trained using the selected EMI amplitude-time series and the conventional telemetry signals for the physical variable. Alternatively, the pattern-recognition module can be trained using the selected EMI amplitude-time series, the conventional telemetry signals for the physical variable, and one or more other conventional telemetry signals for one or more other physical variables. For example, in order to build an inferential CPU temperature model using the pattern-recognition module, one can train the pattern-recognition module using the selected EMI amplitude-time series, the telemetry signals collected from the temperature sensor, and additional telemetry signals collected from a voltage sensor, a current sensor, as well as some software telemetry variables.

Note that this pattern-recognition module can be both a linear regression model and a non-linear, non-parametric (NLNP) regression model. In one embodiment of the present invention, the pattern-recognition module is a multivariate state estimation technique (MSET). Note that the MSET is capable of learning the patterns of interaction between the multiple physical variables (including the one that was used to correlate with the EMI time-series signals) and the selected EMI amplitude-time series, and predicting the values for the physical variable based on the selected EMI amplitude-time series and the learned patterns-of-interaction.

Figure 5:
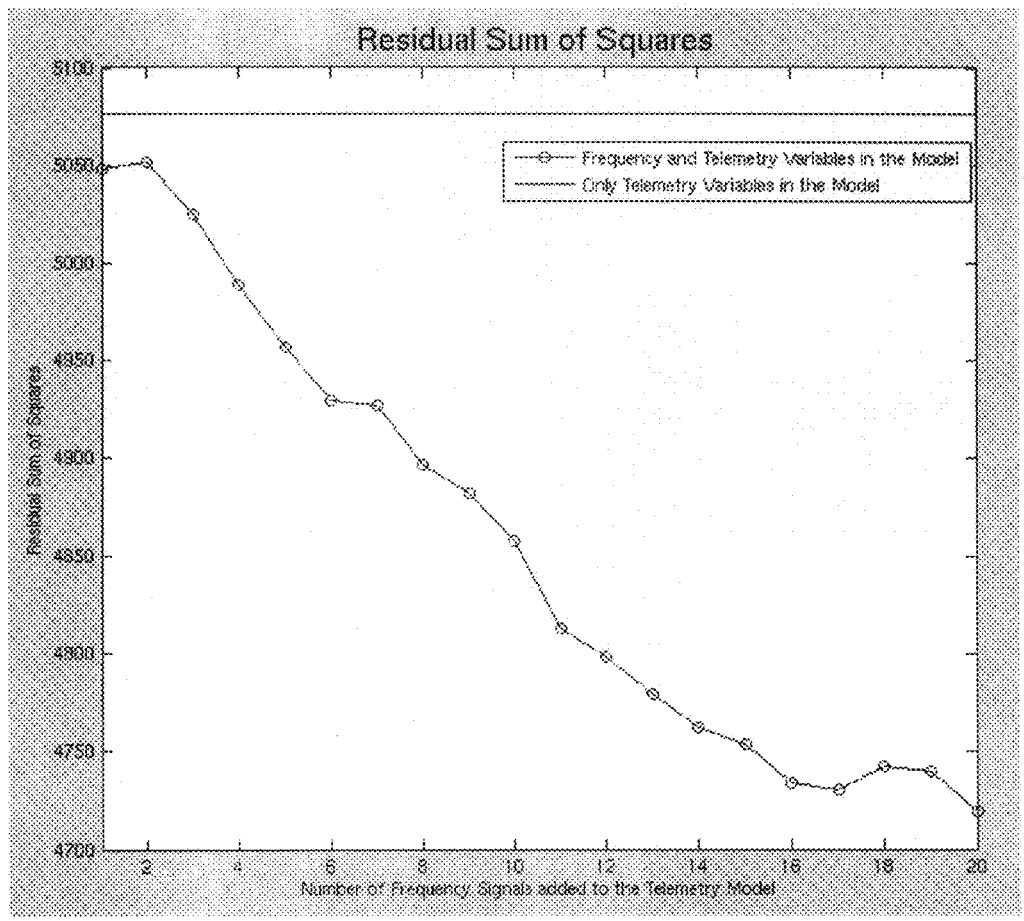
FIG. 5 illustrates the effect of increasing the number of EMI amplitude-time series on the accuracy of the inferential model in accordance with an embodiment of the present invention.

Note that the accuracy of the inferential model can be gradually increased by adding more and more EMI amplitude-time series into the regression model. FIG. 5 illustrates the effect of increasing the number of EMI amplitude-time series on the accuracy of the inferential model in accordance with an embodiment of the present invention. As shown in FIG. 5, the horizontal axis is the number of the EMI amplitude-time series used to train the inferential model, and the vertical axis is the residual-sum-of-squares (RSS) associated with the inferential estimates of a physical signal (in this case a temperature signal for a CPU) using the inferential model. The straight line in the plot represents the RSS for predicting the CPU temperature using only conventional CSTH telemetry signals. The marked line represents the RSS values as the number of EMI amplitude-time series increases sequentially from 1 to 20. Note that adding even one more EMI time series produces an improvement in the inferential model accuracy. As more EMI time series are added into the model, the RSS continues to decrease while the model accuracy continues to improve significantly.

Applications of the Inferential Model

In one embodiment of the present invention, the inferential model for the physical variable X can be used to infer the outputs of a physical sensor associated with the physical variable using only the selected EMI amplitude-time series. This means that the inferential model based on the EMI time series signals can be used to replace the physical sensor, and the estimates produced by the inferential model can be used to replace the conventional telemetry signals for the physical variable. Hence, it is possible to "analytically replace" a failed physical sensor with a "virtual sensor" derived from the EMI signals, without the need to physically replace the failed physical sensor, thereby increasing system availability and lowering maintenance costs. This analytical replacement can be particularly useful in cases where replacing a failed physical sensor would require replacing a complete system board or a FRU. Hence, the inferential-model-based virtual sensor continues to monitor the physical variable and estimate signal values with high accuracy.

In one embodiment of the present invention, the inferential-model-based virtual sensor can be used to reduce the number of "pinouts" associated with on-chip physical sensors. For example, to obtain a complete temperature profile over an IC chip, such as a CPU, one may need to simultaneously monitor multiple sensing points across the chip using multiple thermal diodes. However, it is not practical to do so because it would require multiple pinouts just for the temperature sensor outputs. Using the present invention, one can make a small number of test chips containing high accuracy temperature sensors to help build the inferential model. Then, the actual chips can be manufactured without any physical sensors. To monitor the chip temperature, one can simply place an antenna, such as a piece of stripped wire in the vicinity (e.g., the middle) of the chip to pick up the EMI signals, and then use the inferential-model-based virtual sensor to infer the temperature values at the point of EMI detection based on the real-time EMI signals. Note that the temperature profile for the whole chip can be obtained using conventional temperature simulation techniques. In this way, we not only eliminate pinouts for the temperature sensors, but also save the chip-area by removing the temperature sensors all-together. Note that the benefits of reducing chip pinouts and saving chip real estate is also applicable to other physical sensors other than the temperature sensors.

Process for Inferentially Monitoring a Physical Variable

Figure 6:
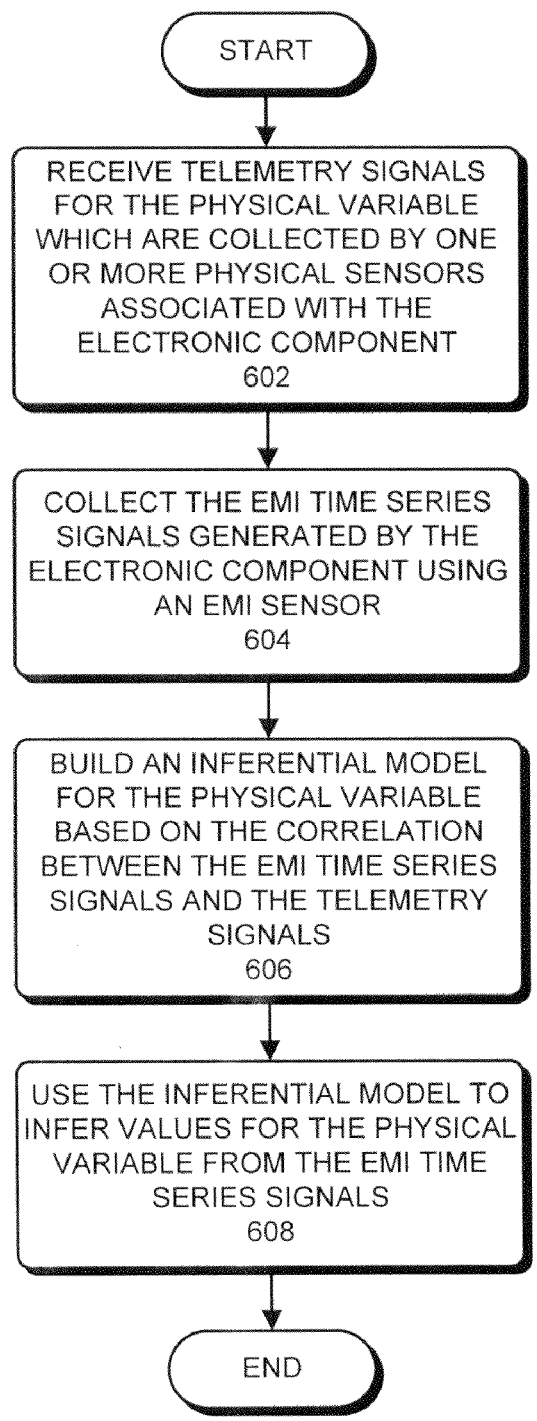
FIG. 6 presents a flowchart illustrating the process of accurately inferring a physical variable associated with an electronic component within a computer system in accordance with an embodiment of the present invention.

FIG. 6 presents a flowchart illustrating the process of accurately inferring a physical variable associated with an electronic component within a computer system in accordance with an embodiment of the present invention.

During operation, the system receives telemetry signals for the physical variable which are collected by one or more physical sensors associated with the electronic component (step 602). In particular, the telemetry signals for the physical variable are collected while the computer system is executing a load script which defines a specified sequence of operations. In one embodiment of the present invention, the electronic component is IC chip, the physical variable is a local temperature on the IC chip, and the one or more physical sensors are temperature sensors, such as thermal diodes.

The system also collects EMI time series signals generated by the electronic component using an EMI sensor (step 604). In particular, the EMI signals are generated by the electronic component while the computer system is executing the same load script. In one embodiment of the present invention, the EMI time series signals are collected by an antenna placed in close proximity to the electronic component.

Next, the system builds an inferential model for the physical variable based on the correlation between the EMI time series signals and the telemetry signals (step 606). In particular, building the inferential model involves training a pattern-recognition model using telemetry signals and a set of selected EMI amplitude-time series signals. The system then uses the inferential model to infer values for the physical variable from the EMI time series signals (step 608).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for monitoring a physical variable associated with an electronic component within a computer system, the method comprising:
   receiving telemetry signals of the physical variable which are collected by one or more physical sensors associated with the electronic component;
   collecting electromagnetic interference (EMI) signals generated by the electronic component;
   building an inferential model for the physical variable based on both the telemetry signals and the EMI signals; and
   using the inferential model to infer values for the physical variable from the EMI signals.

2. The method of claim 1,
   wherein the electronic component is an integrated circuit (IC) chip;
   wherein the physical variable is a local temperature on the IC chip; and
   wherein the one or more physical sensors are temperature sensors.

3. The method of claim 1, wherein collecting the EMI signals generated by the electronic component involves using an antenna placed in close proximity to the electronic component.

4. The method of claim 3, wherein the antenna can be a wire.

5. The method of claim 4, wherein the wire is a stripped wire.

6. The method of claim 1,
   wherein the telemetry signals for the physical variable are collected while the computer system is executing a load script which includes a specified sequence of operations; and
   wherein the EMI signals are generated by the electronic component while the computer system is executing the same load script.

7. The method of claim 1, wherein building the inferential model involves:
   transforming the EMI signals from a time-domain representation to a frequency-domain representation;
   dividing the frequency-domain representation into a plurality of frequency bins;
   constructing an EMI amplitude-time series for each of the plurality of frequency bins based on the EMI signals collected over a predetermined time period;
   selecting a subset of frequency bins from the plurality of frequency bins based on a cross-correlation between each EMI amplitude-time series and the telemetry signals; and
   building the inferential model based on the EMI amplitude-time series associated with the selected frequency bins.

8. The method of claim 7, wherein selecting the subset of frequency bins based on the cross-correlation involves:
   for each of the plurality of frequency bins, computing a cross-correlation between the EMI amplitude-time series and the telemetry signals; and
   selecting the subset of frequency bins that are associated with the highest cross-correlation values.

9. The method of claim 8, wherein building the inferential model based on the EMI amplitude-time series involves using the EMI amplitude-time series associated with the selected frequency bins to train a pattern recognition model.

10. The method of claim 9, wherein the pattern recognition model is a multivariate state estimation technique (MSET).

11. The method of claim 9, wherein the method further comprises increasing the number of selected frequency bins to train the pattern recognition model, thereby improving the accuracy of the pattern recognition model.

12. The method of claim 1, wherein when one physical sensor has degraded, the method further comprises continuing to monitor the physical variable through the EMI signals and the inferential model instead of the physical sensor.

13. A computer-readable storage medium storing instructions that when executed by a computer cause the computer to perform a method for monitoring a physical variable associated with an electronic component within a computer system, the method comprising:
   receiving telemetry signals of the physical variable which are collected by one or more physical sensors associated with the electronic component;
   collecting electromagnetic interference (EMI) signals generated by the electronic component;
   building an inferential model for the physical variable based on both the telemetry signals and the EMI signals; and
   using the inferential model to infer values for the physical variable from the EMI signals.

14. The computer-readable storage medium of claim 13,
   wherein the telemetry signals for the physical variable are collected while the computer system is executing a load script which includes a specified sequence of operations; and
   wherein the EMI signals are generated by the electronic component while the computer system is executing the same load script.

15. The computer-readable storage medium of claim 13, wherein building the inferential model involves:
   transforming the EMI signals from a time-domain representation to a frequency-domain representation;
   dividing the frequency-domain representation into a plurality of frequency bins;
   constructing an EMI amplitude-time series for each of the plurality of frequency bins based on the EMI signals collected over a predetermined time period;
   selecting a subset of frequency bins from the plurality of frequency bins based on a cross-correlation between each EMI amplitude-time series and the telemetry signals; and
   building the inferential model based on the EMI amplitude-time series associated with the selected frequency bins.

16. The computer-readable storage medium of claim 15, wherein selecting the subset of frequency bins based on the cross-correlation involves:
- for each of the plurality of frequency bins, computing a cross-correlation between the EMI amplitude-time series and the telemetry signals; and
- selecting the subset of frequency bins that are associated with the highest cross-correlation values.

17. The computer-readable storage medium of claim 16, wherein building the inferential model based on the EMI amplitude-time series involves using the EMI amplitude-time series associated with the selected frequency bins to train a pattern recognition model.

18. The computer-readable storage medium of claim 17, wherein the pattern recognition model is a multivariate state estimation technique (MSET).

19. The computer-readable storage medium of claim 17, wherein the method further comprises increasing the number of selected frequency bins to train the pattern recognition model, thereby improving the accuracy of the pattern recognition model.

20. The computer-readable storage medium of claim 13, wherein when one physical sensor has degraded, the method further comprises continuing to monitor the physical variable through the EMI signals and the inferential model instead of the physical sensor.

21. An apparatus that monitors a physical variable associated with an electronic component within a computer system, comprising:
- a receiving mechanism configured to receive telemetry signals of the physical variable which are collected by one or more physical sensors associated with the electronic component;
- a collecting mechanism configured to collect electromagnetic interference (EMI) signals generated by the electronic component;
- a building mechanism configured to build an inferential model for the physical variable based on both the telemetry signals and the EMI signals; and
- an inferring mechanism configured to use the inferential model to infer values for the physical variable from the EMI signals.

22. The apparatus of claim 21,
- wherein the electronic component is an integrated circuit (IC) chip;
- wherein the physical variable is a local temperature on the IC chip; and
- wherein the one or more physical sensors are temperature sensors.

23. The apparatus of claim 21, wherein the collecting mechanism is configured to collect the EMI signals by using an antenna placed in close proximity to the electronic component.

24. The apparatus of claim 23, wherein the antenna can be a wire.

* * * * *